Feb. 22, 1966 W. F. MINARD 3,237,109

CONTROL CIRCUIT FOR ELECTRONIC CONDUCTION-LATCHING DEVICES

Original Filed Oct. 17, 1960

2 Sheets-Sheet 1

INVENTOR.
WILLIAM F. MINARD

INVENTOR.
WILLIAM F. MINARD.

United States Patent Office 3,237,109

Patented Feb. 22, 1966

3,237,109

CONTROL CIRCUIT FOR ELECTRONIC CONDUCTION-LATCHING DEVICES

William F. Minard, Plymouth, Mich., assignor to Burroughs Corporation, Detroit, Mich., a corporation of Michigan Continuation of application Ser. No. 63,064, Oct. 17, 1960. This application Mar. 2, 1964, Ser. No. 348,705

8 Claims. (Cl. 328—2)

This invention relates generally to control circuits for electronic conduction-latching devices, a form of which is exemplified by vapor electron or gas filled discharge devices, and is a continuation of application S.N. 63,064, filed October 17, 1960, now abandoned.

It is an object of this invention to provide a control circuit for an electronic latching device, such as a vapor electron discharge device, which is energized or latched into conduction by the action of a photoemissive device, and is thereafter de-energized by the coaction of the photoemissive device and an oscillatory circuit.

It is an additional object to provide a control circuit for an electronic latching device, such as a vapor electron discharge device, which is energized or latched into conduction by a change of state of the photoemissive device from conductive to non-conductive and is thereafter de-energized by the coaction of the photo device returning to its original state and another electronic device connected in an oscillatory circuit with the electronic latching device.

These and other objects of this invention will become more apparent upon consideration of the following description in connection with the accompanying drawings wherein.

In general, this invention provides an electrical control circuit for a utilization device contained in the output of an electronic conduction-latching device that is latched into conduction by an externally controlled control means, such as a photoemissive device, and is unlatched or returned to the control of the external control or photoemissive device by an electronic conducting device, which may be another latching device, used in conjunction with the latching device in an oscillatory circuit. The term electronic conduction-latching device as employed herein refers to devices of the class having a control, cathode and anode electrode and in which conduction is initiated between the cathode and anode electrode from the control electrode after which the device is latched into conduction and the control electrode exerts no further control influence over conduction of the device until it has been extinguished as by a temporary reduction of the anode potential thereof.

Figure 1:
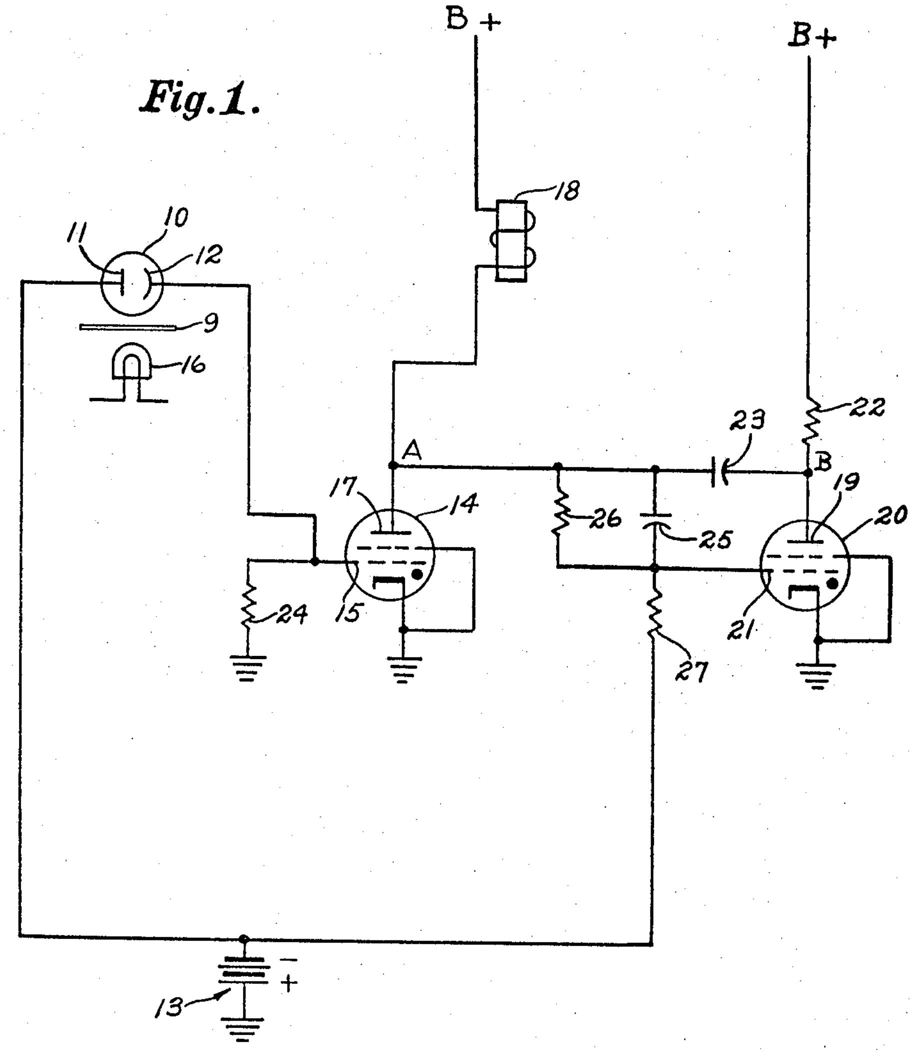
FIG. 1 is a schematic drawing of the control circuit.

In FIG. 1, I have shown a direct current voltage supply designated as a B+ or positive voltage source and a negative voltage source 13. The electrical control having variable conductivity is shown, for example, as a photoemissive device or photocell 10. The photocell has its cathode 11 connected to negative voltage source 13 and its anode 12 coupled to the control electrode or grid 15 of an electronic conduction-latching device shown as a vapor electron discharge device hereinafter referred to as thyratron 14. A light source 16 is maintained in a spaced relationship from photocell 10. The present invention is particularly adapted for use in an electronic bookkeeping machine of the type described in U.S. application Ser. No. 598,454 filed on behalf of William W. Deighton et al. on July 17, 1956, now abandoned, of common ownership herewith. The present electrical circuit provides a reliable and fast acting indication when a coded document 9 enters and leaves a specific posting position in the machine. The photocell 10 operates in a well known manner to conduct current from its cathode 11 to its anode 12 whenever light is impinging thereupon from light source 16. As soon as a document 9 passes between source 16 and photocell 10, the photocell will cease to conduct.

The vapor electron discharge device or thyratron 14 is shown as a tetrode having a gaseous medium. Thyratron 14 has its anode 17 coupled to a relay or solenoid 18 which, when energized, will close its associated contacts (not shown) to initiate further operations of the bookkeeping machine such as reading, posting and the like.

The oscillating means is herein embodied as including an electronic device, which may also be of the electronic conduction-latching variety and is shown herein as a thyratron 20 of substantially the same type as thyratron 14. Thyratron 20 has its anode 19 coupled to the anode 17 of thyratron 14. Anode 19 is further connected to a positive voltage source with load resistor 22 coupled therebetween. A capacitor 23 is connected between the anodes of the thyratrons 14 and 20. A resistor 24 is connected between the grid 15 of thyratron 14 and ground. A capacitor 25 and resistor 26 are connected across capacitor 23 and control grid 21 of thyratron 20 to provide an RC network for maintaining thyratron 20 in an oscillating state. A resistor 27 is connected between grid 21 of thyratron 20 and the negative voltage source 13.

Figures 2, 3, 4, 5, 6, 7:
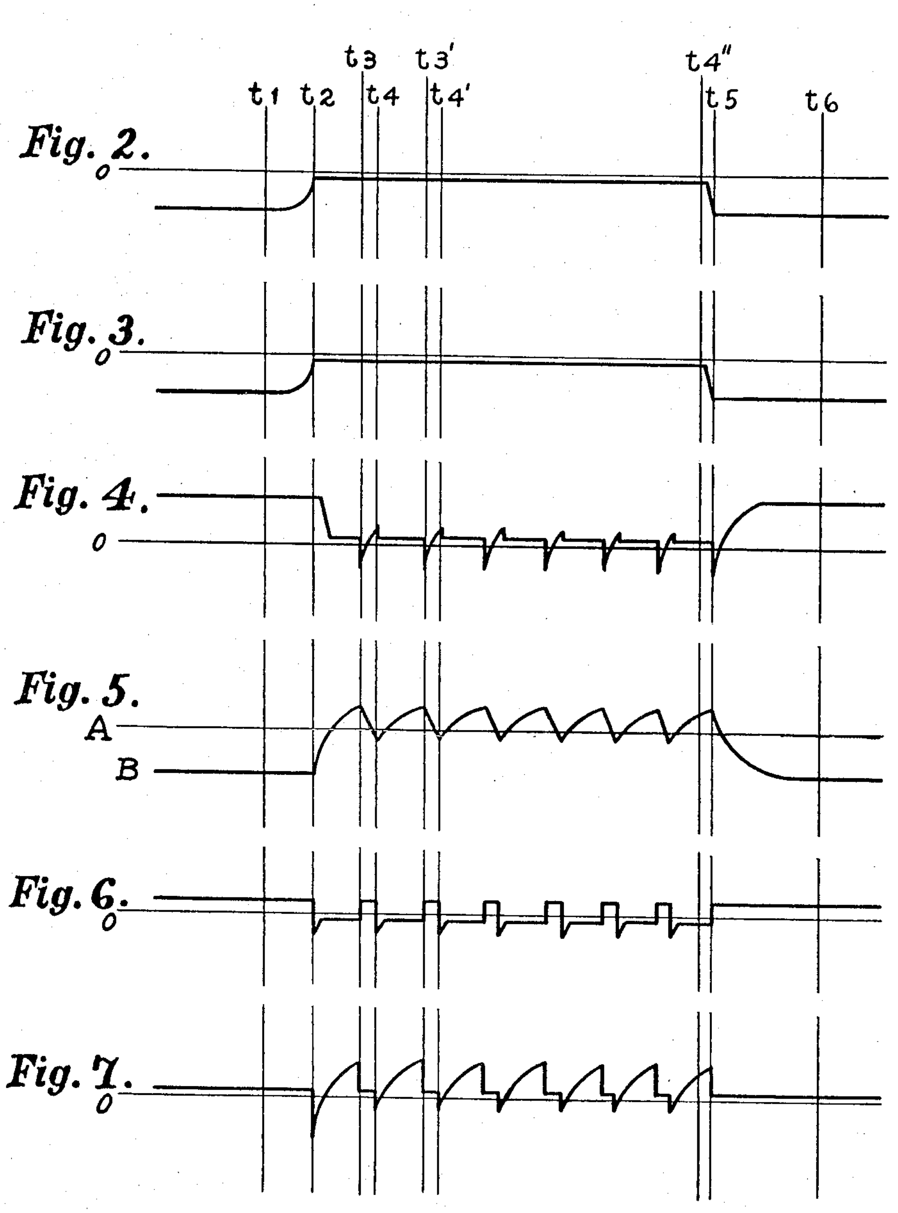
FIGS. 2 through 7 are graphs portraying characteristics of voltage with reference to certain circuit components at various times of operation.

In FIG. 2 the voltage characteristics of anode 12 of photocell 10 are shown.

In FIG. 3 the voltage characteristics of grid 15 of thyratron 14 are shown.

In FIG. 4 the voltage characteristics of anode 17 of thyratron 14 are shown.

In FIG. 5 the voltage characteristics of capacitor 23 are shown as existing at point B with respect to A.

In FIGS. 6 and 7 the voltage characteristics of the grid 21 and anode 19 of thyratron 20, respectively, are shown.

*Mode of operation*

At time $t_1$, when no document 9 is inserted between photocell 10 and light source 16, the photocell is conducting and its anode 12 is at a negative voltage. Control grid 15 of thyratron 14 is also maintained at this same negative voltage. Thyratron 14 is non-conducting and its anode 17 is at a positive voltage as shown in FIG. 4. Capacitor 23 is charged positively at point A, which is at the potential of the anode 17 of thyratron 14, with respect to point B, which is at the potential of the anode 19 of thyratron 20. Grid 21 of thyratron 20 is slightly positive relative to its cathode due to the voltage divider action of the resistors 26 and 27 and the diode action of grid 21 and the grounded cathode. Thyratron 20 is, therefore, in its energized or firing state at $t_1$, as indicated in FIG. 7.

At time $t_2$, a document 9 has been inserted between photocell 10 and light source 16. The photocell changes from a conductive to a non-conductive state, removing the negative bias, as shown in FIGS. 2 and 3, from the control grid 15 of thyratron 14. When the control or grid electrode 15 reaches a potential substantially at ground, thyratron 14 will be energized. As soon as it fires, the voltage at anode 17 of thyratron 14 will drop and be reflected to the anode 19 of thyratron 20. As its anode potential drops below the ionization level, thyratron 20 will be extinguished. Capacitor 23 will begin to charge positively at B with respect to A through thyration 14 and through resistor 22. Resistor 22, it will be noted, is coupled to a source of B+ potential. Grid 21 of thyratron 20 will be driven negative due to the action of the charge on capacitor 25 and will then return to a slightly negative voltage due to the action of the slightly positive voltage on anode 17 of thyratron 14, resistor 26 and 27 and negative biasing source 13.

At time $t_3$, the charge on the capacitor 23 will be sufficiently positive at point B with respect to point A, and the anode 19 of thyratron 20 will be sufficiently positive to permit thyratron 20 to fire with its grid 21 at the potential indicated in FIG. 6 at this time. When thyratron 20 fires, the potential of its anode 19 will immediately drop and this drop will be reflected through capacitor 23 to the anode 17 of thyratron 14, whereby the anode of thyratron 14 will be driven negatively as shown in FIG. 4 and the latter thyratron will then be extinguished. Capacitor 23 will immediately begin to go negative at point B with respect to point A and charged oppositely through now conducting thyratron 20 and solenoid 18 to B+. Grid 21 of thyratron 20 will go slightly positive due to the action of resistors 26, 27 and the inductance in solenoid 18.

At time $t_4$, anode 17 of the now extinguished thyratron 14 will have become charged to a slightly positive voltage and will refire due to the continued presence of the high level control signal from the photocell input circuit connected to its control electrode. Therefore, the anode potential of thyratron 14 will drop and the drop will be reflected through capacitor 23 to anode 19 to extinguish thyratron 20. Capacitor 23, point B with respect to A, will begin to charge positively as shown in FIG. 5. Anode 19 of thyratron 20 will become charged positively. Grid 21 of thyratron 20 will be driven negative due to the action of the charge on capacitor 25 and will then return to a slightly negative voltage due to the positive potential on anode 17 of thyratron 14, resistor 26, 27 and biasing source 13.

A time $t_3'$, the anode 19 of thyratron 20 will have a sufficiently positive voltage to fire thyratron 20 under the slightly negative control of grid 21. Thyratron 14 will be extinguished and thyratron 20 will be firing.

At time $t_4'$, conditions similar to those existing at the time $t_4$ prevail, the circuit having undergone two complete oscillations of alternating cycles of conduction of the devices 14 and 20. Thyratron 14 will be firing and thyratron 20 will be extinguished.

It should be noted that the brief de-energization periods of thyratron 14 as shown by FIG. 4 do not permit the collapse of the magnetic field of solenoid 18 so that the function of the solenoid is not interrupted. It may be stated that the circuit has the well known function of a relaxation oscillator and serves to furnish an output of a non-sinusoidal form to the anode 17 of thyratron 14 as shown in FIG. 7.

At time $t_5$, the external control has returned to its original condition as by the removal of the document 9 from its light blocking position between the photocell 10 and light source 16. In FIGS. 2 through 7, at time $t_4''$, I have shown where the removal of a document has commenced beyond a time $t_4'$ and before another time $t_3'$ has occurred. Time $t_5$ represents the time when thyratron 20 will fire under the same condition as a normal time $t_3$ or $t_3'$, except that this time, anode 12 of photocell 10 is no longer in a positive state. Removal of the document has caused the light to impinge on the photocell 10 changing its condition from a non-conductive to a conductive state. Anode 12 of photocell 10 and grid 15 of thyratron 14 become charged negatively as shown in FIGS. 2 and 3. As anode 17 of thyratron 14 charges positively, its control grid 15 is biased negative as in the original quiescent state. This negative bias or low level control signal is below the critical point as determined by the grid control ratio for thyratron 14. The grid 15 will therefore prevent energization of thyratron 14 for all values of anode potential within the range of operation. Capacitor 23 will continue to charge positively at point A so that point B with respect to point A will assume its negative charge in the original quiescent state. Anode 19 and grid 21 of thyratron 20 will again be charged slightly positive.

At time $t_6$, the same quiescent condition existing at time $t_1$ exists. No document is interposed between photocell 10 and light source 16. Thyratron 14 is in its normally de-energized state deactivating the utilization device 18, and the thyratron 20 is maintained in an energized state.

The above exemplary embodiment contemplates the employment of the present control circuit in connection with sheet positioning. It will be appreciated that the function and mode of operation of the control circuit are readily adaptable to a great variety of uses and modifications.

What is claimed is:

1. Apparatus for sensing the presence or absence of a document at a specific position in a bookkeeping machine and for energizing a solenoid to initiate a specific bookkeeping operation on said document upon the sensing thereof at said position therein, the combination comprising a normally nonconducting first electric discharge device having input and output electrodes, a normally conducting second electric discharge device having input and output electrodes, a solenoid connected to the output electrode and a photoresponsive means connected to said input electrode of said first discharge device, said photoresponsive means being in a conductive state in the absence of a document at said position and rendering said first discharge device conductive when said photoresponsive means attains a nonconductive state in the presence of a document at said position, and means, forming with said discharge devices, a normally disabled electronic oscillatory timer including a capacitor connecting said output electrode of said first discharge device to the output electrode of said second discharge device and a biasing circuit coupling the output electrode of said first discharge device to the input electrode of said second discharge device, said capacitor chargeable in one direction through one of said discharge devices when it is conducting and in an opposite direction through the other discharge device when the latter is conducting, said timer enabled when said photoresponsive means is rendered nonconductive to turn said first discharge device on and reverse the conducting states of said discharge devices, said timer, when enabled, cyclically operating to return said second discharge device back on its conductive state through said biasing circuit a first predetermined time after said first discharge device has been turned on by said photoresponsive means and said capacitor is charging in one of said directions through said first discharge device and then to return said first discharge device to a conductive state a second predetermined time after said second discharge device has been turned back on and said capacitor is charging in the other of said directions through said second discharge device, the above described cyclical operation continuing until such time as the photoresponsive means is returned to its conductive state and said first discharge device has been turned off with the return of the second discharge device to its conductive state.

2. Light responsive apparatus for controlling the energization of a solenoid in accordance with the presence or absence of illumination on a light sensitive means comprising the combination of a normally nonconducting first de-ionizable thyratron type device having input and output electrodes with the solenoid connected to the output electrode and the light sensitive means connected to said input electrode thereof, a normally conducting second de-ionizable thyratron type device having input and output electrodes, said light sensitive means being in a conductive state in the presence of illumination thereon and rendering said first thyratron type device conductive when said light sensitive means attains a nonconductive state in the absence of illumination thereon, and means, forming with said thyratron type devices, a normally disabled electronic oscillatory timer including a capacitor connecting said output electrode of said first thyratron type device to the output electrode of said second thyratron type device and a biasing circuit coupling the output electrode of said first thyratron type device to the input electrode of said second thyratron type device, said capacitor chargeable in one direction through one of said thyratron type devices when it is conducting and in an opposite direction through the other thyratron type device when the latter is conducting, said timer enabled when said light sensitive means is rendered nonconductive to turn said first thyratron type device on and reverse the conducting states of said thyratron type devices, said timer, when enabled, cyclically operating to return said second thyratron type device back on to its conductive state through said biasing circuit a first predetermined time after said first thyratron type device has been turned on by said light sensitive means and said capacitor is charging in one of said directions through said first thyratron type device and then to return said first thyratron type device to a conductive state a second predetermined time after said second thyratron type device has been turned back on and said capacitor is charging in the other of said directions through said second thyratron type device, the above described cyclical operation continuing until such time as the light sensitive means is returned to its conductive state and said first thyratron type device has been turned off with the return of the second thyratron type device to its conductive state, said first and second predetermined times constituting a cycle of operation of said timer and each of said times being of a longer duration than the equivalent de-ionization period of either of said thyratron type devices.

3. In a sheet feed system having a path of travel for a sheet, a control system for signalling the presence of a sheet at a predetermined point in the path of travel comprising a plate of a first normally nonconducting thyratron, a plate of a second normally conducting thyratron, a timer electrically connected to said plates of said first and said second thyratrons, responsive to the turning on of said first thyratron and resulting in an oscillation of conduction between said first and said second thyratrons in accordance with a predetermined timed relationship, a control grid for each of said first and second thyratrons, a photocell electrically connected to said control grid of said first thyratron responsive to the presence of a sheet and effective to turn on said first thyratron, and coupling means including time constant means having a predetermined charge and discharge time electrically connecting said plate electrode of said first thyratron to said grid electrode of said second thyratron.

4. The combination described in claim 3 wherein the timer has a predetermined charge and discharge rate of longer duration than the de-ionization period of either of said thyratrons.

5. A control circuit for a vapor discharge device comprising, a first vapor discharge device having input and output electrodes, a photocell circuit including a serially connected photocell having an anode and cathode, a source of operating potential, and a work resistor and connected at the junction of the resistor and the photocell to the input electrode of said first vapor discharge device, a utilization device operably connected to said output electrode, a second vapor discharge device having input and output electrodes, capacitor coupling means connected between said output electrodes of said first and said second vapor discharge devices and between said output electrode of said first vapor discharge device and said input electrode of said second vapor discharge device, a first resistor electrically connecting said output electrode of said first vapor discharge device and said input electrode of said second vapor discharge device, a second resistor electrically connected to said input electrode of said second vapor discharge device and forming a voltage divider with said first resistor, and a plate load resistor connected to said output electrode of said second vapor discharge device.

6. A control circuit for a vapor discharge device comprising, a photocell having an anode and cathode, a source of direct current, said cathode of said photocell connected to the negative terminal of said source, a first thyratron having a plate, cathode, and control electrodes, a grounded first resistor the other end of which is connected to said control electrode of said first thyratron, the anode of said photocell connected to said control electrode, a solenoid electrically connected to said plate of said first thyratron, a second and third resistor connected in electrical series, one end of said serially connected resistors connected to the plate of said first thyratron and the other end connected to the negative terminal of said source of potential, a second thyratron having a plate, cathode and control grid, said control grid connected to the junction point of said second and said third serially connected resistors, a first capacitor having one terminal connected to the plate of said first thyratron and the other terminal connected to the control grid of said second thyratron, a second capacitor connected from the plate of said first thyratron to the plate of said second thyratron, and a fourth resistor connected to the plate of said second thyratron, whereby the nonconduction of said photocell enables said first thyratron to conduct; said second thyratron, through said second capacitor and said fourth resistor, responsive to said conduction of said first thyratron to cut off said second thyratron and a predetermined time later, as established by the charge and discharge rate of said second capacitor and fourth resistor, to re-establish said second thyratron to a conducting state and said first thyratron to a nonconducting state, this oscillating condition continuing until the reconduction of said photocell.

7. A control circuit for an electronic conduction-latching device of the type having a control, cathode and anode electrode and in which conduction is initiated between the cathode and anode electrode from the control electrode after which the control electrode exerts no further control over conduction of the device until it has been extinguished as by a temporary reduction of the anode potential thereof; an input circuit for said device including a serially connected photocell having an anode and cathode, a source of input operating potential having one side connected to the cathode of the photocell, a resistor having one terminal connected to the anode of the photocell and to the control electrode of said device and its other terminal connected to the other side of said source of input operating potential, and means for illuminating said photocell; an output circuit including a source of output operating potential and a utilization device connected between the anode electrode of said electronic latching device and the source of output operating potential, said utilization device being normally deactivated in the presence of illumination on said photocell and adapted to be energized by current flow from said source of operating potential through said electronic latching device upon the removal of illumination on said photocell to latch said device into conduction; and means for re-establishing control of said utilization device from the control electrode of said electronic latching device comprising a second electronic latching device having a control, cathode and anode electrode, capacitor coupling means connected between the anode electrodes of the first device and the second device and between the anode electrode of said first device and the control electrode of said second device, a second resistor connected between the anode electrode of the first device and the control electrode of said second device, a third resistor electrically connected to the control electrode of said second device and forming a voltage divider with said second resistor, and an anode load resistor connected between the anode electrode of said second electronic latching device and said source of output operating potential.

8. A control circuit for an electronic conduction-latching device of the type having a control, cathode and anode electrode and in which conduction is initiated between the cathode and anode electrode from the control electrode after which the device is latched into conduction and the control electrode exerts no further control over conduction of the device until it has been extinguished as by a temporary reduction of the anode potential thereof; an input circuit including a light responsive means connected to the control electrode of said latching device and supplying a negative D.C. control signal thereto in the presence of illumination on said light responsive means; an output circuit including a source of output operating potential and a utilization device connected between the anode electrode of said electronic latching device and the source of output operating potential, said D.C. control signal rendering said electronic latching device non-conductive to maintain said utilization device deactivated until the illumination on said light responsive means is decreased to cause the electronic latching device to latch into conduction; and means for re-establishing control of said utilization device from the control electrode of said electronic latching device comprising an electronic device having a control, cathode and anode electrode, a potential divider in circuit with said source of output operating potential and connected at its junction to supply a potential to the control electrode of the second electronic device to render it conducting when the first electronic device is non-conductive, an impedance connected between the anode electrode of said second electronic device and said source of output operating potential, and capacitor coupling means connected between the anode electrodes of said first and second electronic devices.

References Cited by the Examiner

UNITED STATES PATENTS 2,162,508 6/1939 Knowles ------------- 328—2

JOHN W. HUCKERT, *Primary Examiner.*